June 24, 1924.
L. M. BOYLE
SUPPLY OUTFIT FOR VEHICLES, ETC
Filed April 8, 1920
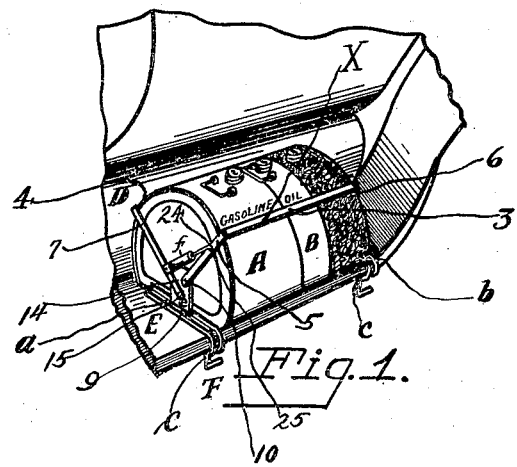
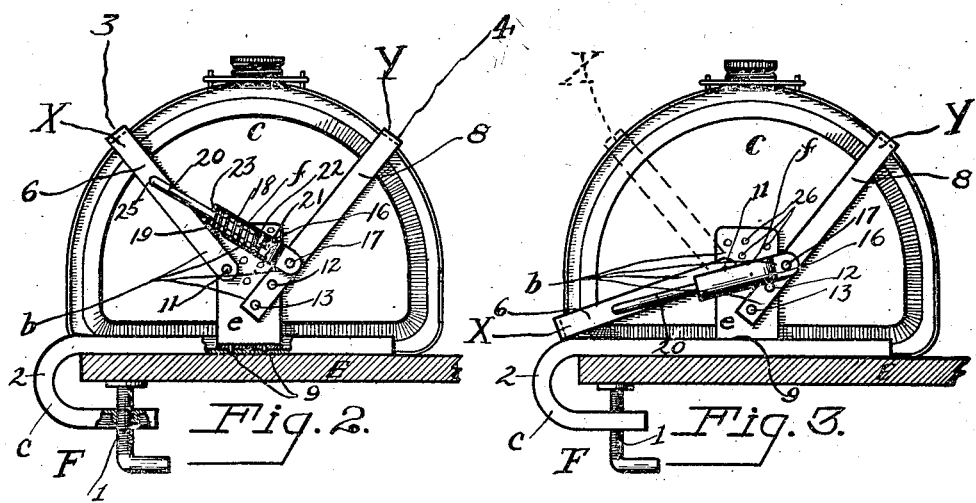
Inventor,
Louis M Boyle;
By
Attorney.

Patented June 24, 1924.

1,498,831

UNITED STATES PATENT OFFICE.

LOUIS M. BOYLE, OF LOS ANGELES, CALIFORNIA.

SUPPLY OUTFIT FOR VEHICLES, ETC.

Application filed April 8, 1920. Serial No. 372,330.

*To all whom it may concern:*

Be it known that I, LOUIS M. BOYLE, a citizen of the United States, residing at Los Angeles, in the county of Los Angeles and State of California, have invented new and useful Improvements in Supply Outfits for Vehicles, Etc., of which the following is a specification.

This invention relates to supply outfits for vehicles, and particularly for automobiles, and similar motor vehicles, and likewise for power launches and other vessels.

The invention has for its object to provide in combination with a vehicle of its frame, and preferably its running-board or any suitable side extension or fender, or possibly seat or other structure, a plurality of containers or canteens which may be used for storing various commodities such as gasoline, oil, water or food stuffs, and suitable means for holding said containers or canteens to the running-board. The invention has for a particular object the provision of an improved supply outfit of the general character mentioned which may likewise be readily attached to and removed from the running-board or other portion of a vehicle.

The invention has for further objects the provision of an improved supply outfit for vehicles and the like, which will be superior in point of relative simplicity and inexpensiveness of construction, taken in conjunction with positiveness and convenience and effectiveness in use, and reliability in operation, and which will be generally superior in serviceability and efficiency.

With the above and other objects in view, the invention consists in the novel and useful provision, formation, combination, association and relative arrangement of parts, members and features, all as hereinafter described, shown in the drawing, and finally pointed out in claims.

In the drawing:

Figure 1 is a fragmentary perspective view of a supply outfit organized to embody the invention, the same being shown as applied to a portion of the running-board of a motor vehicle;

Figure 2 is a fragmentary vertical end elevation certain parts being shown in section of the supply outfit shown in Figure 1; and, Figure 3 is a view similar to Figure 2, but showing the clamping and retaining member in a releasing position so that the canteen or container or other objects may be withdrawn from the frame members.

Corresponding parts in all the figures are designated by the same reference numbers.

Referring with particularity to the drawing, the improved supply outfit for vehicles and the like, shown therein, comprises, referring to Figure 1, a plurality of container units or canteens A, B and C which are associated or combined with a body D and a running-board E of a motor vehicle, and means F for temporarily and positively, as well as releasably binding or combining together the afore-mentioned features and units, so as to firmly and securely transport such units in travel of the vehicle and protect the units. The units A, B and C ordinarily have their face portions so that each of the units may closely embrace each other and be in parallel relation to each other. The means F for temporarily and positively, as well as releasably holding the units A, B and C, includes two members $a$ and $b$, similar in construction and in oppositely facing directions as clearly indicated in Figure 1. Each of the units $a$ and $b$ comprises an attaching element $c$ which is directly applied to the running-board E and is provided preferably with a suitable securing device, such as a screw cap 1 which is brought to bear directly upon the running-board, preferably beneath the same, to firmly bind the attaching element $c$ to the running-board, such attaching device preferably including a hooked or curved bar 2 overlapping one edge of the running-board and so embracing the latter. The means F further includes substantially rigid bars 3 and 4 having at their ends angularly disposed extremities 5 and 6 for the bar 3, and 7 and 8 for the bar 4. Each of the attaching elements $c$ has joined to it as at 9 an upright $e$. The angularly disposed extremities 5 and 6 of the bar 3 are pivotally joined as at 10 and 11 to the upright members $e$, and the bar 4 has its angularly disposed extremities 7 and 8 fixedly joined as at 12, 13, 14 and 15 to the upright members $e$. The bar 3 with its angularly disposed extermities 5 and 6 constitutes a swinging clamping and retaining frame, while the bar 4 with its angularly disposed extremities 7 and 8 which are fixedly connected to the upright members $e$, constitutes a fixed clamping and retaining frame for any container or canteen that may be disposed within and between said members. A link device *f* pivotally joins the fixed clamping and retaining frame and the swinging clamping and retaining frame. The link device *f* of which there are two, includes a tubular portion 16 pivotally joined to the fixed clamping and retaining member and to the angularly disposed extremities 7 and 8 of same, as at 17. Within the tubular portion as at 18 there is disposed a yielding means such as a spring 19. A portion 20 provided with an enlarged head 21 at one end slides within the tubular portion 18 and co-acts with the spring 19 as at 22. In order to ensure that the spring 19 will always be retained within the tubular member 18 the end of the tubular member shown at 23 is bent so as to have inwardly disposed extremities. The opposite end of the member 20 has an angularly disposed extremity 24 which passes through perforations 25 located in the members 5 and 6.

By referring to Figures 2 and 3 it will be observed that the member *f* constitutes an extensible spring-actuated link and so joins the fixed retaining frame and the swinging frame so as to have an eccentric relation thereto when canteens or containers are mounted between said frames. When the swinging and retaining frame which we will designate as X is in the position shown in Figure 2, it will be observed that the member *f* being in an off center relation to the pivoted points 10 and 11 of same, will successfully keep the retaining frame X in close relation to any member or members embraced by said frame, and the fixed retaining frame which we will designate as Y. Referring to Figure 3 it will be seen that the swinging clamping and retaining frame X has been moved downwardly from the position shown in Figure 2 and also from the position shown by the dotted lines in Figure 3, and it will be observed that the member *f* is in eccentric relation to the pivoted points 10 and 11 of the frame X so that the frame X will be held in the position shown in Figure 3. Thus the contents or containers or canteens disposed within the frame may be readily removed from the frame member for any purpose desired.

A plurality of perforations 26 are provided in each of the upright members *e* so that various adjustments may be made when placing the members X and Y upon the upright members *e*. Likewise, when the swinging clamping and retaining frame X and the fixed retaining frame Y are in position, the canteens shown in Figure 1 as A, B and C, will not only be held by the bars 3 and 4, against displacement in two directions, and by the running-board and the relative positions of the bars 3 and 4 when they are in the position shown in Figure 1 against displacement in two other directions, but will be held by the attaching elements *c* and the uprights *e* and the link member *f*, as well as by the angularly disposed extremities 5 and 7, and the angularly disposed extremities 6 and 8, against displacement in the two remaining directions; thus the units A, B and C are positively and unfailingly held in position upon the running-board for transportation. It is to be noted that the members X and Y are substantially rigid in structure and that the portions as 3 and 4 of said members have contact with the objects as A, B and C in a zone transverse to the direction of the application of the clamping pressure.

Thus, while the supply outfit as described is simple and comprises few parts, the device has a wide range of adaptability and utility, or versatility of performance, at the same time performing its service effectively and without liability to breakage or derangement of the parts and features. It may likewise be applied and removed quickly and easily, and the adjustment and operation of its parts and features are performed with extreme simplicity and convenience and an economical expenditure of time. I am aware that means have been devised for holding objects or articles in position, of the same general class as the invention of this application, and having members embracing such objects or articles at the side or sides thereof, such members being held in positions of engagement by means constraining the same so as to draw them toward each other into engagement with the work or object, such means also co-operating with or engaging with or assisted by the work. However, the present invention in an important aspect relates to members for engaging the work and held in such positions of engagement, so as to embrace the work, by means acting directly between the members or at least independently of the assistance of the object. Thus in accordance with the present invention, it is unnecessary to disengage anything from the work, excepting said members, prior to releasing the work for removal, and also unnecessary to apply anything to the work, other than said members, to position the work firmly so that it will be held positively in place.

From the foregoing it will be observed that the present invention provides a running board kit clamping device comprising a frame consisting of the brackets 2 for engaging with the running board, the said brackets being connected by the fixed wicket-like bar 4 rigidly carried by the upright members *e* thereby to provide in effect a cradle opening at the outer side of the running board to permit of the ready placing and removal of the emergency kit units. These kit units A, B and C for example are locked in place by the relatively movable clamping or locking bar 3 also of the wicket type, and which is adapted to be moved to positions to clear or obstruct access to the cradle. Therefore, it will be understood that the present device provides means for holding the kit units in place entirely independent of the units themselves, in other words the locking means f does not depend on engagement with the kit units to provide an effective lock. That feature is made possible by the link device f having an engagement with both the movable member 3 and the fixed member 4, and comprising means therewith for holding them in position to clamp the kit units in place, or for permitting the member 3 to rest open to facilitate the placing and removal of the kit units in the device.

It is manifest that many variations and departures in construction, formation, combination, mode of application and method of use of parts, members and features of the supply outfit may be made without departure from the spirit of the invention and a fair interpretation thereof.

Having thus disclosed my invention, I claim and desire to secure by Letters Patent:

1. In improvements of the character disclosed, a plurality of clamping and retaining members, separate means for mounting the same and with which said members are connected so as to permit relative movement between the same, and yielding means inter-connecting said members and whereby the same may be positively held in work-engaging relation or in relation to free the work.

2. In improvements of the character disclosed, a plurality of clamping and retaining members, means for mounting the same and with which said members are connected so as to permit relative movement between the same, and yielding means inter-connecting said members and whereby the same may be held in work-engaging relation or in relation to free the work; one of said members being mounted to swing, and said yielding inter-connection means being pivotally connected with one of said members and adapted to pass the center of the swinging movement of said swinging member in the relative movement of said members.

3. In improvements of the character disclosed, a plurality of clamping and retaining members, means for mounting the same and with which said members are connected so as to permit relative movement between the same, and yielding means inter-connecting said members and whereby the same may be positively held in work-engaging relation or in relation to free the work; each of said members comprising a bar provided with angularly directed end portion by which said bars are separately mounted.

4. In improvements of the character disclosed, a plurality of clamping and retaining members, means for mounting the same and with which said members are connected so as to permit relative movement between the same, and yielding means inter-connecting said members and whereby the same may be held in work-engaging relation or in relation to free the work; one of said members being mounted to swing, and said yielding inter-connection means being pivotally connected with one of said members and adapted to pass the center of the swinging movement of said swinging member in the relative movement of said members; said inter-connection means comprising a two-part link provided with a spring acting upon the parts to shorten the length of the link.

5. Improvements of the character disclosed, comprising two relatively movable clamping and holding members elongated transversely to their paths of movement and adapted to embrace the work, means for mounting the same, and yielding means operating upon the clamping and holding members and urging the same into work-embracing relation; said means for mounting said members comprising uprights provided with clamps, one of said members being rigidly connected with said uprights and the other of said members being mounted in connection with said uprights so as to be capable of swinging.

6. Improvements of the character disclosed, comprising two relatively movable clamping and holding members adapted to embrace the work, means for mounting the same, and yielding means operating upon the clamping and holding members and urging the same into work-embracing relation; said means for mounting said members comprising uprights provided with clamps, one of said members being rigidly connected with said uprights and the other of said members being mounted in connection with said uprights so as to be capable of swinging; said yielding means comprising a spring-controlled extensible link pivotally connected with said members and adapted to pass the center of swinging action of said member mounted to swing in the swinging movement of said latter member.

7. The combination with a vehicle running-board or like support, of spaced securing means mounted upon the running-board, a plurality of independent containers resting upon the running-board between the securing means and fitting against each other, and clamping and retaining members mounted in connection with said securing means and adapted to embrace the containers, one of said clamping and retaining members being mounted to swing; means being provided tending to hold said members either in container-embracing or container-releasing position.

8. The combination with a vehicle running-board or like support, of spaced securing means mounted upon the running-board, a plurality of independent containers resting upon the running-board between the securing means and fitting against each other, and clamping and retaining members mounted in connection with said securing means and adapted to embrace the containers, one of said clamping and retaining members being mounted to swing; means being provided tending to hold said members either in container-embracing or container-releasing position; one of said members being mounted to swing with relation to the other of said members, and said means tending to hold said members in relation to each other and the containers comprising a spring-controlled extensible link between the members and adapted to pass the center of swinging movement of said member which is mounted to swing.

9. The combination, with two clamps provided each with an upright; of an extended clamping member fixedly connected at its ends with said uprights, a movable clamping member pivoted at its ends in connection with said uprights, and a spring-controlled extensible link pivotally connected with both clamping members.

10. The combination, with two clamps provided each with an upright; of an extended clamping member fixedly connected at its ends with said uprights, a movable clamping member pivoted at its ends in connection with said uprights, and a spring-controlled extensible link pivotally connected with both clamping members and adapted to swing across the points of pivotal connection of said pivoted clamping member or hold the clamping members either in work-embracing or work-releasing position.

11. An emergency kit carrier adapted to be attached to the running board of an automobile including oppositely arranged upstanding article clamping and retaining members which are relatively movable toward and from each other, and a device having an engagement with both of said members and comprising means therewith for holding them in article clamping positions and for permitting the same to rest in open relation for inserting and removing the article.

12. An emergency kit holder adapted to be attached to the running board of an automobile comprising attaching brackets, a fixed member carried by said brackets and constituting a rear abutment for the kit units, and a relatively movable member disposed at the outer side of the running board, and means for connecting said relatively fixed and movable members whereby the movable member may be shifted to clearing or obstructing relation to the outer side of the said kit units.

13. An emergency kit holder adapted to be attached to the running board of an automobile comprising attaching brackets, a relatively fixed member carried by said brackets and constituting an abutment at the inside of the running board for the kit units, and a relatively movable member also carried by said brackets and disposed at the outer side of the running board, and means engaging with said fixed and movable members for holding them in position to secure the kit units or permitting said movable member to rest open to place and remove said kit units.

14. An emergency kit holder comprising a frame having means for attaching the same to the running board of an automobile and providing a cradle opening at the outer side of the running board, a kit clamping bar movably connected to the frame and adapted to be shifted into and out of obstructing relation to the kit at the outer open side of the cradle, and means for permitting said kit clamping bar to rest in clearing or obstructing relation to the kit at the open side of said cradle.

In testimony whereof, I have signed my name to this specification in the presence of two subscribing witnesses.

LOUIS M. BOYLE.

Witnesses:
L. M. DRAKE,
MARY F. REDDING.